June 3, 1952 G. C. SZIKLAI 2,598,857

TELEVISION SIGNAL CONVERTER

Filed Jan. 29, 1949 2 SHEETS--SHEET 1

INVENTOR
George C. Sziklai
BY [signature]
ATTORNEY

June 3, 1952 G. C. SZIKLAI 2,598,857

TELEVISION SIGNAL CONVERTER

Filed Jan. 29, 1949 2 SHEETS—SHEET 2

Fig 2

| RECEIVER CHANNEL SLECTOR 12 AT | OSC. SW. 0 ANT. SW-NORM. MC. RANGE | OSC. SwA. 306 Mc. ANT. SW. "ON" MC. RANGE | OSC. Sw-B. 348 Mc. ANT. SW. "ON" MC. RANGE | OSC. SwC. 390 Mc. ANT. SW. "ON" MC. RANGE |
|---|---|---|---|---|
| 1 | CHN. 1 44-50 | | | |
| 2 | CHN. 2 54-60 | | | |
| 3 | CHN. 3 60-66 | | | |
| 4 | CHN. 4 66-72 | | | |
| 5 | CHN. 5 76-82 | | | |
| 6 | CHN. 6 82-88 | | | |
| 7 | CHN. 7 174-180 | CHN. 14 480-486 | CHN. 21 522-528 | CHN. 28 564-570 |
| 8 | CHN. 8 180-186 | CHN. 15 486-492 | CHN. 22 528-534 | CHN. 29 570-576 |
| 9 | CHN. 9 186-192 | CHN. 16 492-498 | CHN. 23 534-540 | CHN. 30 576-582 |
| 10 | CHN. 10 192-198 | CHN. 17 498-504 | CHN. 24 540-546 | CHN. 31 582-588 |
| 11 | CHN. 11 198-204 | CHN. 18 504-510 | CHN. 25 546-552 | CHN. 32 588-594 |
| 12 | CHN. 12 204-210 | CHN. 19 510-516 | CHN. 26 552-558 | CHN. 33 594-600 |
| 13 | CHN. 13 210-216 | CHN. 20 516-522 | CHN. 27 558-564 | CHN. 34 600-606 |

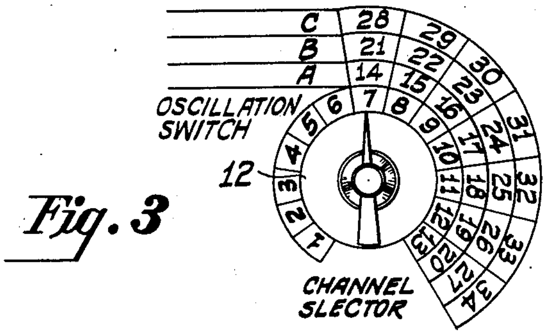

Fig. 3

INVENTOR
George C. Sziklai
BY
[signature]
ATTORNEY

Patented June 3, 1952

2,598,857

UNITED STATES PATENT OFFICE 2,598,857

TELEVISION SIGNAL CONVERTER

George C. Sziklai, Princeton, N. J., assignor to Radio Corporation of America, a corporation of Delaware Application January 29, 1949, Serial No. 73,634

1 Claim. (Cl. 250—20)

The present invention relates to television receiving systems and particularly to a device for extending the range of television frequencies over which television receivers with limited frequency range may be utilized.

In more particularity, the present invention concerns itself with a novel form of heterodyned signal converter for use in conjunction with present-day 13 channel television receivers so as to extend the frequency range of the receiver to include a plurality of channel assignments extending higher in frequency than the highest television channel for which the television receiver is normally adapted to receive.

As the result of the rapid growth of the television art, there has arisen the desire to construct greater numbers of television transmitting stations in a given service area. The actual number of transmitting stations permitted operation has been greatly limited by the number of available television channels, which presently include only 13 divided into groups; channels 1 through 6 are irregularly placed between the frequencies of 44 megacycles to 88 megacycles while channels 7 through 13 are regularly spaced within the range of 174 megacycles to 216 megacycles. In order to provide a relief in the present construction restrictions of new television stations, there has been considerable thought given to the assignment of an additional 21 channels extending from 480 megacycles to 606 megacycles.

Obviously, present-day television receivers adapted to receive only channels 1 through 13 (44 megacycles to 88 megacycles and 174 megacycles to 216 megacycles) would not normally provide service on these additional high frequency channels (480 megacycles to 606 megacycles) without considerable redesign and rebuilding of the individual equipments. This would present considerable cost to the receiver owner with a resulting receiver undoubtedly lacking in performance due to compromise dictated through the addition of circuit elements to an already engineered receiver. Moreover, the design of new receiver circuits, including "front end" tuners adapted to cover the range from 44 megacycles to 206 megacycles in separate steps, would impose difficult design problems.

The present invention contemplates the use of an arrangement which extends the range of the present-day 13 channel television receivers to include the proposed channels 14 through 34 by means of an additional signal transducer connected between the television antenna and the television receiver antenna posts. In one form the signal transducer of the present invention employs means for providing 3 heterodyne signals at discrete frequencies of 306 megacycles, 348 megacycles, and 390 megacycles which beat with the incoming channels 14 through 34 to produce new signals in the frequency range between channels 7 and channels 13, which of course are readily accepted by the receiver. A novel coding arrangement between the transducer and the receiver may be employed so as to provide ready selection of any of the additional channels.

It is therefore a purpose of the present invention to provide a broad band signal transducer adapted to concomitantly transduce a plurality of high frequency radio channels into a plurality of medium frequency channels for selective utilization by equipments selectively responsive only to medium frequency channels.

Another object of the present invention resides in the provision of a radio channel signal transducer which selectively transduces a plurality of adjacent high frequency channels into a plurality of grouped signals having frequencies falling in a fewer and fixed number of adjacent medium frequency channels such that a medium frequency radio channel receiver having response only to signals falling in the fixed number of medium frequency channels may be applied to selectively receive intelligence from the greater number of high frequency channels.

It is another purpose of the present invention to provide a simple and novel signal transducer for use with present-day television receivers to extend their operating frequency range.

It is further an object of the present invention to provide a convenient means for adapting a substantially low frequency television receiving circuit for reception of television signals having an orderly channel assignment at frequencies considerably higher and beyond the range of the receiving circuit. It is further an object of the present invention to describe a novel selective means for incorporation in television receiving circuits which permits a large range of operating frequencies to be utilized by a receiving circuit design normally applicable only to a substantially reduced range of operating frequencies.

The invention possesses numerous other objects and features of advantage some of which together with the foregoing will be set forth in the following description of specific embodiments utilizing the novel method of the present invention. It is therefore to be understood that the present invention is applicable to other apparatus and systems and that its utility is in no way limited to the specific embodiments of the present application as other advantageous embodiments in accordance with the present invention as set forth in the appended claim will occur to those skilled in the art after having benefited from the teachings of the following description especially when considered in connection with the following drawings in which:

Figure 2 is a tabulation of operating characteristics typical of the arrangement shown in Figure 1.

Figure 3 depicts one form of channel selector scale inscription which finds particular use in conjunction with the present invention.

Figure 1:
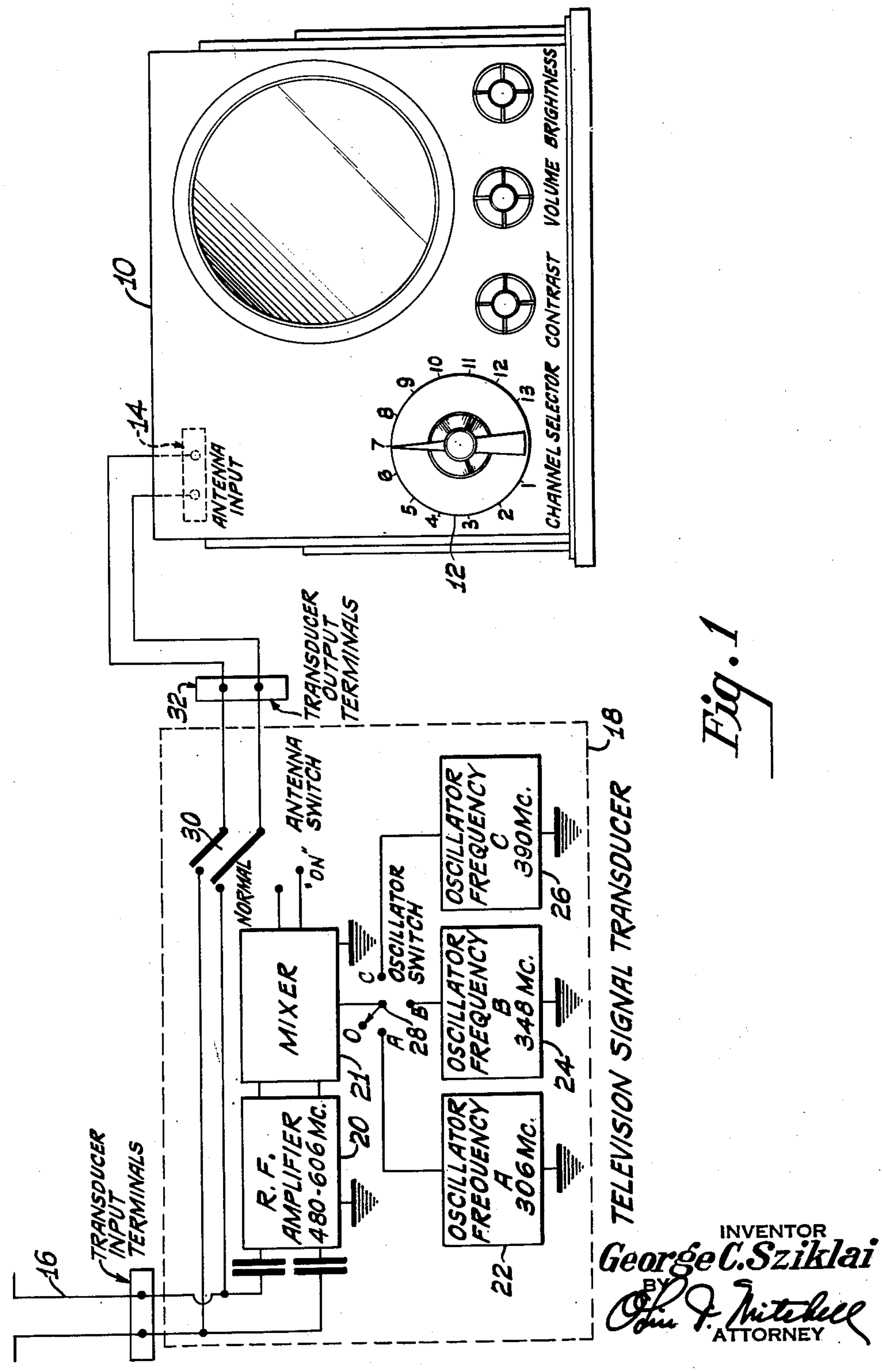
Figure 1 is a block representation of the present invention as applied to a signal transducer for operation in conjunction with existing television receiving equipment.

Referring now to Figure 1, there is represented at 10 a conventional television receiver typical of present-day vintage adapted to receive channels 1 through 13. Selection between channels 1 through 13 is provided by the channel selector switch 12 which in Figure 1, by way of example, is indicated as being of the rotary selector type. As hereinbefore brought out, the receiver 10 with its antenna input terminals 14 connected directly to an appropriate antenna, such as 16, would only be useful in receiving television signals extending in the range of 44 megacycles and 216 megacycles.

According to the present invention, a signal transducer, such as indicated in the dotted line area 18, is selectively interposed between the antenna 16 and the receiver antenna input terminals 14 so as to allow reception by the receiver 10 of television signals extending in the range of 480 megacycles to 606 megacycles presently proposed to embrace an additional 21 television channels of 6 megacycles each. The signal transducer 18 includes an RF amplifier 20, a mixer circuit 21, and means including the oscillator frequency sources 22, 24, and 26 for producing separate converter signals A, B, and C of 306 megacycles, 348 megacycles, and 390 megacycles respectively. The oscillator switch 28 is provided so as to select the particular oscillator frequency, if any, to be applied to the mixer 21 and thereby to become non-linearly combined with the incoming television signals appearing at the output of the RF amplifier 20.

To allow normal operation of the receiver 10, the antenna switch 30 is provided so as to allow the signals made available at the transducer output terminals 32 to be derived either directly from the antenna 16 or mixer 21. The switch 30 is shown in the position for normal operation of the receiver 10 in the reception of the channels 1 through 13.

Referring now to Figure 2, there is shown a representation in tabular form of useful frequency ranges for the receiver 10 under the conditions indicated in the headings of the four vertical columns for the 13 positions of the selector switch 12. For example, with the oscillator switch 28 at the position 0 and the antenna switch 30 in the normal position, the receiver antenna input 14 is directly connected to the antenna 16 which permits normal operation of the receiver 10 in the reception of channels 1 through 13. This is indicated in the first vertical column when reading from left to right on the chart.

According to the first operating mode of the present invention as indicated in the second vertical column in Figure 2, the oscillator switch 28 is connected to receive the oscillator frequency A of 306 megacycles while the antenna switch 30 is thrown on the "on" position thereby connecting the antenna input terminals 14 of the receiver 10 to the output of the mixer 21. Under these conditions, the 306 megacycles converter signal delivered by the oscillator will heterodyne with the frequencies 480 to 522, of channels 14 through 20, to bring them within the range of the receiver 10. The frequency A of 306 megacycles has been chosen so that the channels 14 through 20 will, when heterodyned, be respectively available at positions 7 through 13 of the channel selector switch 12.

Correspondingly, the third vertical column of Figure 2 shows operation of the transducer to permit reception of channels 21 through 27 by the positioning of oscillator switch 28 to the position B, the antenna switch 30 remaining in the "on" position. Under these conditions, the converter oscillator frequency B of 348 megacycles is heterodyned with the incoming channels 14 through 34 such that channels 21 through 27 fall in the respective frequency ranges covered by channels 7 through 13. Therefore, channels 21 through 27 are available by positioning of channel selector switch 12 to the corresponding positions between channels 7 through 13.

Similarly, positioning of the oscillator switch 28 to position C with the antenna switch 30 remaining "on" will permit the oscillator frequency C of 390 megacycles to heterodyne with the incoming high frequency signals to allow reception of signals 28 through 34 by suitable positioning of the channel selector 12 at positions between 7 through 13.

Although for illustrative simplicity in Figure 1 the oscillator frequencies A, B, and C have been shown as derived from separate blocks 22, 24, and 26, it is clear that the frequencies A, B, and C could be produced by a single oscillator or signal generator with the selector switch 28 operating to change the mode of operation or oscillation of the single oscillator to yield the discrete frequencies A, B, and C at the respective positionings of the oscillator switch.

It will be noticed that the oscillator frequencies A, B, and C have been chosen such to always be below the higher frequency channel to be received. This consideration of oscillator frequency placement is of particular importance when utilizing receiving circuits which are sensitive in their response to the relative positioning of the sound carrier with respect to the video carrier. Furthermore, the placement of the oscillator beneath the carrier to be received is convenient in that it simplifies the design of the oscillator over an oscillator designed for operation at the necessarily higher frequencies.

Another feature of advantage which comes by way of using the lower oscillator frequencies is that should the oscillators in the transducer 18 and the receiver 10 tend to drift due to temperature change, line supply voltage, or aging of the tubes, the effect of the drifting will be in a relation tending to compensate each other. Since the transducer circuits are all broad-band circuits, one may rely upon the second local oscillator, which is in the receiver, for automatic frequency control. if such feature is available.

The general arrangement shown and described in connection with Figures 1 and 2 may in practice take a variety of useful forms. For instance, in Figure 3 there is shown adjacent the channel selector switch 12 a supplementary index scale with numbers corresponding to the channels 14 through 34. These 21 channels are conveniently grouped into three parts of 7 each and are positioned adjacent the channel positions 7 through 13 on the original selector switch index scale. Thus the three groups of 7 channels each may be assigned letters A, B, and C corresponding to the oscillator converter frequencies 306 megacycles, 348 megacycles, and 390 megacycles. Should then the operator wish to receive channel 14, all that would be necessary for operation would merely be to adjust the channel selector to the position shown in Figure 3 (corresponding to channel 7) and turn the oscillator switch to position A. With the channel selector switch at this position (7), utilization of oscillator frequencies B and C will, of course, provide selection on respective channels 21 and 28. In one every convenient form of the transducer 18, the oscillator switch 28 may take the form of a push-button type of selector and can further be ganged with the antenna switch 30 so that upon selection of oscillator frequencies A, B, or C, the antenna switch is thrown in the "on" position.

Although the present invention has been shown as adapted to a signal transducer for connection with existing television equipment, it is plain that the novel division of the additional television bands and choice of oscillator frequencies in accordance with the present invention may be readily incorporated in the design of future television receiver "front ends." Such a receiver may then come equipped with three push buttons and a single channel selector switch 12 having an associated index scale as shown in Figure 3. This, of course, would greatly simplify the design of such a wide range receiver and yet provide a degree of operational flexibility and convenience which is markedly greater than had a single selector switch been adapted for positioning at 34 discrete positions.

Moreover, it is apparent that a considerable saving in cost for a wide range television receiver "front end" may be realized through the use of the present invention. For example, in a television receiver RF "front end" incorporating a push-pull RF amplifier, a push-pull converter and push-pull oscillator, it is common practice to utilize 6 separate inductances for each channel to be received. Thus, according to present conventional design a 34 channel receiver would require 204 separate inductances, not to mention the associated trimmer capacitors, etc., that would be necessarily associated therewith. However, according to the present invention, a 34 channel television receiver can easily be constructed having virtually the same "front end" as a conventional 13 channel receiver which utilizes only 78 separate inductances with the addition of a single oscillator having a single tapped inductor for the obtaining of the 3 discrete frequencies set forth above, i. e., 306 megacycles, 348 megacycles, and 390 megacycles, as well as 3 interstage tuned circuit coupling inductances, 1 broadband tuned circuit input inductance (120 megacycles wide), and 1 medium broadband tuned circuit inductance (40 megacycles wide). The entire "front end" would then require 78+5 or only 83 separate inductances as compared with 204. This economy in circuit cost, it will be appreciated, will also be attended by considerable economy in circuit size and complexity, thus making for easier servicing and alignment.

In the foregoing description of the present invention, reference has been made to three discrete frequencies for heterodyning with the incoming high frequency channels. As shown, the exact values of these frequencies are derived solely from the particular distribution in the radio spectrum of existing commercial television channels and upon the probable additional channel frequencies that will be assigned as the television art progresses. Therefore, should any change in present channel assignments or in prognosticated channel assignments be made, it is evident that the principle interlying the present invention would in no way be affected, the invention itself being applicable to a large number of channel grouping arrangements. Consideration is also directed to the possibility of dividing the higher frequency channels into a different number of groups for transducing purposes. With the present invention, however, it is clear that a single transducer oscillator frequency must be provided for each group or subgroup of high frequency channels being transduced.

From the foregoing, it is seen that the applicant has provided a simple, novel, and economical signal transducer for use in conjunction with radio receiving circuits and a transducer which finds particular application to existing television receivers for expanding their effective range of operating frequencies, and moreover, that the general arrangement presented by the invention may be readily incorporated in the design of tuner circuits for more modern design broad frequency range equipments if so desired.

What is claimed is:

For operation with a television communication receiver system having input terminals and an antenna and having a tuner having discrete tuning positions wherein the assigned television channels may be divided into a medium frequency group and a high frequency group, and wherein the respective television intelligence in each channel occupies the lower portion of the channel while the associated sound intelligence occupies the upper portion of the respective channel, a high frequency channel television signal transducer for television receivers having manually controllable means for selectively receiving consecutive and adjacent medium frequency channels, said signal transducer comprising in combination: means for communicating high frequency channel signals, said communicating means having an input terminal and an output terminal, means connecting said communicating means between the television receiving antenna and the television receiver input terminals, a source of converting signal energy adapted to selectively develop a plurality of different but substantially fixed converting signals bearing a predetermined frequency relationship with one another, the converting signal frequencies all falling between the highest medium frequency channel and the lowest high frequency channel, output terminals for said converting signal source, frequency controlling means connected with said converting signal source for selectively determining the frequency of the converting signal made available at said converting signal source output terminals, a non-linear mixer arrangement having input and output circuits and adapted to heterodyne the high frequency channel signals appearing at the output of said high frequency channel signal communicating means with the converting signal appearing at the converting signal source output terminals to produce a series of difference intelligence signals in the mixer arrangement output circuit, means for selectively coupling the television receiver input terminals with said mixer arrangement output circuit, said converting signal energy source being so related to the received signal that the intelligence carried by the high frequency channels is made selectively available at medium frequencies for selective utilization by said television mixer manually controllable selective means at the same tuning positions for said medium frequency group of channels without interference from the medium frequency signals.

GEORGE C. SZIKLAI.

REFERENCES CITED

The following references are of record in the file of this patent:

UNITED STATES PATENTS

| Number | Name | Date |
|---|---|---|
| 1,987,616 | Gebhard | Jan. 15, 1935 |
| 1,987,857 | Lewis | Jan. 15, 1935 |
| 2,028,212 | Heising | Jan. 21, 1936 |
| 2,141,756 | Linsell | Dec. 27, 1938 |
| 2,186,455 | Goldmark | Jan. 9, 1940 |
| 2,383,322 | Koch | Aug. 21, 1945 |